(12) United States Patent
Zhang

(10) Patent No.: US 10,119,612 B2
(45) Date of Patent: Nov. 6, 2018

(54) METHOD AND DEVICE FOR PROMPTING BICYCLE GEAR SHIFTING

(71) Applicant: Xiaomi Inc., Beijing (CN)

(72) Inventor: Rui Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 49 days.

(21) Appl. No.: 15/183,422

(22) Filed: Jun. 15, 2016

(65) Prior Publication Data

US 2017/0051828 A1    Feb. 23, 2017

(30) Foreign Application Priority Data

Aug. 19, 2015 (CN) .......................... 2015 1 0512988

(51) Int. Cl.
| | |
|---|---|
| *F16H 63/42* | (2006.01) |
| *G06Q 10/06* | (2012.01) |
| *B62J 6/00* | (2006.01) |
| *G07C 5/08* | (2006.01) |
| *B62M 25/00* | (2006.01) |

(52) U.S. Cl.
CPC .............. *F16H 63/42* (2013.01); *B62J 6/001* (2013.01); *G06Q 10/063* (2013.01); *G07C 5/08* (2013.01); *B62M 2025/003* (2013.01); *F16H 2063/426* (2013.01)

(58) Field of Classification Search
None
See application file for complete search history.

(56) References Cited

U.S. PATENT DOCUMENTS

| | | | | | |
|---|---|---|---|---|---|
| 5,059,158 | A | * | 10/1991 | Bellio ...................... | B62M 9/12 474/103 |
| 5,356,348 | A | * | 10/1994 | Bellio ...................... | B62M 9/12 280/238 |
| 5,538,477 | A | * | 7/1996 | Bellio ...................... | B62M 9/12 474/103 |
| 5,569,104 | A | * | 10/1996 | Bellio ...................... | B62M 9/12 280/260 |

(Continued)

FOREIGN PATENT DOCUMENTS

| | | |
|---|---|---|
| CN | 1297833 C | 1/2007 |
| CN | 1315690 C | 5/2007 |

(Continued)

OTHER PUBLICATIONS

International Search Report of PCT Application No. PCT/CN2015/098693, dated May 25, 2016, issued by the State Intellectual Properly Office of P.R. China as ISA (5 pages).

(Continued)

*Primary Examiner* — Colby M Hansen
(74) *Attorney, Agent, or Firm* — Finnegan, Henderson, Farabow, Garrett & Dunner LLP

(57) ABSTRACT

A method for prompting bicycle gear shifting includes collecting cycling data of a user during cycling, comparing the collected cycling data with cycling data samples in a preset gear shifting strategy library including correspondence relationships between preset gear shifting strategies and the cycling data samples, and when the collected cycling data matches one of the cycling data samples in the gear shifting strategy library, outputting the gear shifting strategy corresponding to the cycling data sample to the user.

11 Claims, 7 Drawing Sheets

(56) References Cited

U.S. PATENT DOCUMENTS

| | | | |
|---|---|---|---|
| 5,728,017 A * | 3/1998 | Bellio | B62M 9/12 280/261 |
| 6,047,230 A | 4/2000 | Spencer et al. | |
| 2010/0198453 A1 | 8/2010 | Dorogusker et al. | |
| 2014/0015659 A1 | 1/2014 | Tetsuka | |
| 2014/0070930 A1 | 3/2014 | Hara | |
| 2014/0371953 A1 | 12/2014 | Miller et al. | |

FOREIGN PATENT DOCUMENTS

| | | |
|---|---|---|
| CN | 100336696 C | 9/2007 |
| CN | 101353031 A | 1/2009 |
| CN | 103538690 A | 1/2014 |
| CN | 103661707 A | 3/2014 |
| CN | 104417709 A | 3/2015 |
| CN | 104802915 A | 7/2015 |
| EP | 0527864 A1 | 2/1993 |
| EP | 2 581 299 A1 | 4/2013 |
| JP | 2000-108982 A | 4/2000 |
| JP | 2002-260146 A | 9/2002 |
| JP | 2006-298012 A | 11/2006 |
| KR | 10-2010-0083312 A | 7/2010 |
| KR | 10-2010-0116052 A | 10/2010 |
| KR | 10-2012-0055145 A | 5/2012 |
| RU | 2250174 C2 | 4/2005 |
| TW | 201339049 A | 10/2013 |
| WO | WO 9117078 A1 | 11/1991 |
| WO | WO 2014/205345 A2 | 12/2014 |
| WO | WO 2015/073791 A1 | 5/2015 |

OTHER PUBLICATIONS

Extended European Search Report for European Application No. 16169276.9 dated Nov. 22, 2016.

English translation of International Search Report for PCT Application No. PCT/CN2015/098693, dated May 25, 2016, issued by the State Intellectual Property Office of P.R. China as ISA (2 pages).

* cited by examiner

METHOD AND DEVICE FOR PROMPTING BICYCLE GEAR SHIFTING

CROSS-REFERENCE TO RELATED APPLICATIONS

The present application is based upon and claims priority to Chinese Patent Application CN201510512988.4, filed Aug. 19, 2015, the entire contents of which are incorporated herein by reference.

TECHNICAL FIELD

The present disclosure generally relates to a bicycle and, more particularly, to a method and device for prompting gear shifting of a bicycle.

BACKGROUND

A bicycle, especially a sport bicycle, such as a mountain bicycle, a road bicycle, or the like, usually has a complex speed changing system, including two cogsets, i.e., a front cogset attached to the crankset of the bicycle and a rear cogset attached to the rear wheel. Each of the cogsets can include a plurality of sprockets with different sizes. Sprockets in the front cogset, also referred to as "driving sprockets," and sprockets in the rear cogset, also referred to as "driven sprockets," can be freely combined to meet different road conditions. The combinations of the driving sprockets and the driven sprockets can be controlled by a gear shifting set including two shifters each controlling one of the cogsets. A user needs to manually switch the shifters to achieve speed changing. This increases the complexity in operation and control, making it difficult for non-professional cyclists, i.e., ordinary cyclists to perform gear shifting operations.

SUMMARY

In accordance with the present disclosure, there is provided a method for prompting bicycle gear shifting. The method includes collecting cycling data of a user during cycling, comparing the collected cycling data with cycling data samples in a preset gear shifting strategy library including correspondence relationships between preset gear shifting strategies and the cycling data samples, and when the collected cycling data matches one of the cycling data samples in the gear shifting strategy library, outputting the gear shifting strategy corresponding to the cycling data sample to the user.

Also in accordance with the present disclosure, there is provided a terminal including a processor and a memory storing instructions that, when executed by the processor, cause the processor to collect cycling data of a user during cycling, compare the collected cycling data with cycling data samples in a preset gear shifting strategy library including correspondence relationships between preset gear shifting strategies and the cycling data samples, and when the collected cycling data matches one of the cycling data samples in the gear shifting strategy library, output the gear shifting strategy corresponding to the cycling data sample to the user.

Also in accordance with the present disclosure, there is provided a non-transitory storage medium having stored therein instructions that, when executed by one or more processors of a mobile terminal for prompting bicycle gear shifting, cause the mobile terminal to collect cycling data of a user during cycling, compare the collected cycling data with cycling data samples in a preset gear shifting strategy library including correspondence relationships between preset gear shifting strategies and the cycling data samples, and when the collected cycling data matches one of the cycling data samples in the gear shifting strategy library, output the gear shifting strategy corresponding to the cycling data sample to the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
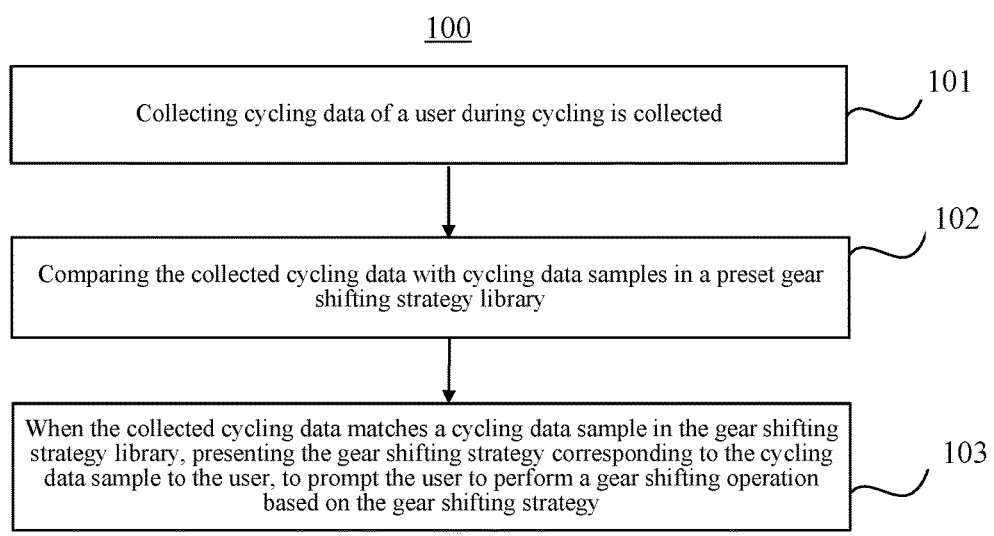
FIG. 1 is a flow chart illustrating a method for prompting bicycle gear shifting according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used herein are merely for describing particular embodiments, rather than limiting the present disclosure. As used in the present disclosure and the appended claims, terms in singular form such as "a," "said," and "the" are intended to also include plural forms, unless explicitly dictated otherwise. It should also be understood that the term "and/or" used herein means any one or any possible combination of one or more associated listed items.

Further, if an element is described with a term first, second, or third, etc., the element is not limited by such a term. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when," "where," or "in response to."

As discussed above in the Background section, an ordinary cyclist without professional training or appropriate instructions may not be able to properly operate a speed changing system. For example, the ordinary cyclist may shift to a wrong gear or fail to shift a gear in time. Unreasonable speed changes may disturb cycling rhythm, consume excessive physical strength, increase the burden on knees, result in excessive mechanical wear, and/or cause the user to miss steps, leading to danger.

The present disclosure provides methods for prompting bicycle gear shifting. In some embodiments, cycling data of a user is collected while the user is cycling, and is compared with cycling data samples in a preset gear shifting strategy library. The gear shifting strategy library includes correspondence relationships between preset gear shifting strategies and cycling data samples. When the collected cycling data matches a cycling data sample in the gear shifting strategy library, the gear shifting strategy corresponding to the cycling data sample is outputted to the user to prompt the user to perform a gear shifting operation based on the gear shifting strategy. Therefore, according to the present disclosure, non-professional cyclists can also perform correct gear shifting operations in different cycling environments with the prompt of the output gear shifting strategy.

Methods consistent with the present disclosure can be implemented, for example, in a terminal and can be implemented through a gear shifting prompt logic loaded in a preset APP, referred to herein as a cycling APP, installed in the terminal. The terminal can be a mobile terminal, such as a smartphone carried by the user. Alternatively, the terminal can be an on-bicycle terminal preinstalled on the bicycle, such as a smart terminal or a smart module installed on the bicycle.

The bicycle has a speed changing system including a pre-installed electronic gear shifting set. The operating principle of the electronic gear shifting set is similar to that of a traditional gear shifting set, but the electronic gear shifting set may have a higher accuracy and can accurately record the gear shifting operations of the user as gear shifting operation data. Meanwhile, the electronic gear shifting set can provide an interface for the user. Through the interface, the above-mentioned APP installed on the mobile terminal can read the gear shifting operation data recorded by the electronic gear shifting set.

In the embodiments described below, a mobile terminal carried by the user is used as an example of the terminal.

FIG. 1 is a flow chart illustrating a method for prompting bicycle gear shifting according to an exemplary embodiment. As shown in FIG. 1, at 101, cycling data of a user during cycling is collected. At 102, the collected cycling data is compared with cycling data samples in a preset gear shifting strategy library. The gear shifting strategy library includes correspondence relationships between preset gear shifting strategies and cycling data samples. At 103, when the collected cycling data matches a cycling data sample in the gear shifting strategy library, the gear shifting strategy corresponding to the cycling data sample is outputted to the user, to prompt the user to perform a gear shifting operation based on the gear shifting strategy.

Thus, while the user is cycling, the mobile terminal carried by the user collects cycling data of the user in real time. The cycling data can include any one or any combination of a cycling track, road condition information, a cycling speed, etc. The cycling track can be a three-dimensional track recorded while the user is cycling, and can include a GPS motion track and altitude changing data and gradient changing data corresponding to the GPS motion track. As such, a three-dimensional cycling track of the user can be outputted to the user.

In some embodiments, the cycling data can be collected by built-in sensors of the mobile terminal. For example, a built-in GPS sensor can collect GPS position information and the altitude of the user in real time. The GPS motion track of the user is generated according to the collected GPS position information. The altitude changing data and the gradient changing data of the user are generated according to the collected altitude.

Further, a built-in gravity sensor (G-sensor) can sense changes of accelerating force while the user is cycling. The accelerating force is a force acting on an object during an accelerating process of the object. For example, the G-sensor can convert various movement changes, such as shaking, falling off, going up, and going down, to an electrical signal, and thus can detect actual road conditions according to the accelerating changes sensed in real time while the user is cycling. For example, violent shaking or bumping indicates the road condition may be a rugged mountain road. Smooth and steady movement indicates the road condition may be a flat road. Up or down movement indicates the road condition may be an upslope road or a downslope road.

Further, a built-in speed sensor can collect the cycling speed of the user in real time. An average cycling speed of the user can be calculated according to a cycling time of the user and a cycling distance, based on GPS position change information collected by the GPS sensor.

The mobile terminal can save the collected cycling data locally. The cycling APP can read the cycling data saved by the mobile terminal in real time.

In the present embodiment, the cycling APP can further provide a preset gear shifting strategy library. The gear shifting strategy library can include preset gear shifting strategies and corresponding cycling data samples. A gear shifting strategy refers to a suggested gear shifting operation for the user. The gear shifting strategy library can be created by the cycling APP based on a plurality of cycling data samples and gear shifting operation data.

For example, the gear shifting strategy library can be created through experiments conducted with a plurality of preset users, such as professional cyclists. Each preset user can carry a mobile terminal having the cycling APP and ride a bicycle having the electronic gear switching set on different roads. When the preset user is riding the bike, the mobile terminal collects cycling data of the preset user by the built-in sensors, and the electronic gear switching set of the bicycle records the gear shifting operations of the preset user.

The cycling APP connects to the interface provided by the electronic gear switching set and reads the gear shifting operation data of the preset user recorded by the electronic gear switching set to the mobile terminal. The gear shifting operation data generally includes an occurring time of the gear shifting operation when the preset user is cycling and a corresponding gear shifting result of the gear shifting operation. The gear shifting result includes a gear ratio after the preset user performs the gear shifting operation on the bicycle, i.e., a ratio of the number of teeth of a driving gear to the number of teeth of a driven gear, which can be changed by adjusting the shifters corresponding to the front and rear cogsets.

Compared to non-professional cyclists, professional cyclists can better perform gear shifting operations and can control bicycles more accurately when riding in different cycling environments. The gear shifting operation data and cycling data generated using professional cyclists as the preset users can be combined with respect to the same time axis, and such data can reflect the gear shifting strategies of the professional cyclists in different cycling environments. For example, the data can reflect what gear ratio a professional cyclist chooses at different gradients, speeds, or roads.

Therefore, after the cycling APP successfully reads the gear shifting operation data of the preset user through the interface, the cycling APP further reads the cycling data at the time when the gear shifting operation of the preset user occurs, i.e., the cycling data of the preset user collected by the mobile terminal when the gear shifting operation of the preset user occurs. The read cycling data, which is used as a cycling data sample, and the gear shifting operation data of the preset user are quantitatively processed to generate a corresponding gear shifting strategy.

In some circumstances, invalid gear shifting operations, such as misoperations or meaningless gear shifting operations, may occur. Therefore, before processing the cycling data sample and the gear shifting operation data of the preset user to generate the corresponding gear shifting strategy, the cycling APP can further perform data correction on the gear shifting result in the gear shifting operation data, such as deleting abnormal gear shifting results, as described below.

In some embodiments, the cycling APP can perform a reverse verification on the gear shifting result based on the cycling data sample. Specifically, the cycling APP acquires the road condition information when the gear shifting operation occurs by analyzing the cycling data sample, and then judges whether the preset user makes a reasonable gear shifting operation under such a road condition. If it is unreasonable, the gear shifting operation is an abnormal gear shifting operation, and the cycling APP can delete the gear shifting result corresponding to the gear shifting operation, such that the gear shifting strategies can be more reasonable.

For example, by analyzing the cycling data sample, the cycling APP determines that the preset user just enters an upslope road when the preset user performs the gear shifting operation. Usually, when a cyclist rides on an upslope road, the cyclist decreases the gear ratio to save physical strength. Therefore, if the gear shifting operation result corresponding to the cycling data sample is an operation to increase the gear ratio at this time, the gear shifting operation is an unreasonable gear shifting operation. The cycling APP can determine the gear shifting result corresponding to such a gear shifting operation to be an abnormal gear shifting result and delete it.

After the gear shifting strategy corresponding to the cycling data sample and the gear shifting operation data of the preset user is generated, the cycling APP can save the correspondence relationship between the generated gear shifting strategy and the cycling data sample in an existing gear shifting strategy library, or create a gear shifting strategy library if no gear shifting strategy library exists and save the correspondence relationship in the created gear shifting strategy library.

In the examples described above, the gear shifting strategy library is created by the cycling APP based on cycling data samples and corresponding gear shifting operation data. In some embodiments, a person, such as a technician, can analyze the cycling data samples and gear shifting operation data, and manually create the gear shifting strategy library. The manually created gear shifting strategy library can then be manually loaded to the cycling APP.

According to the present disclosure, the preset gear shifting strategy library created based on the gear shifting operation data and the cycling data of preset users, such as professional cyclists, can be used to teach ordinary cyclists how to shift a gear while cycling.

Specifically, when a user, such as an ordinary cyclist, rides a bicycle, the mobile terminal can collect the cycling data of the user in real time, and compare the collected cycling data with cycling data samples in the gear shifting strategy library. If the collected cycling data matches a cycling data sample in the gear shifting strategy library, the cycling strategy in the gear shifting strategy library corresponding to the cycling data sample can be outputted to the user as an optimum gear shifting strategy, to prompt the user to perform a gear shifting operation based on the optimum gear shifting strategy.

In some embodiments, if the cycling data completely matches one of the cycling data samples in the gear shifting strategy library, it indicates that the current road condition completely matches the road condition corresponding to the cycling data sample. At this time, the cycling APP can output the gear shifting strategy in the gear shifting strategy library corresponding to the cycling data sample to the user as the optimum gear shifting strategy.

On the other hand, if the cycling data does not completely match any of the cycling data samples in the gear shifting strategy library, the cycling APP can further calculate a similarity between the cycling data and each of one or more of the cycling data samples in the gear shifting strategy library, to determine the cycling data sample in the gear shifting strategy library that has the highest similarity. The current road condition is similar to the road condition corresponding to the cycling data sample having the highest similarity. As this time, the gear shifting strategy in the gear shifting strategy library corresponding to the cycling data sample having the highest similarity can be outputted to the user as the optimum gear shifting strategy.

To calculate the similarity between the cycling data and a cycling data sample in the gear shifting data library, the cycling APP calculates errors between respective data in the cycling data and corresponding data in the cycling data sample in the gear shifting data library. The cycling data sample in the gear shifting strategy library that has a minimum error for each of the respective data is used as the cycling data sample having the highest similarity.

For example, the cycling data can include data such as a cycling track, road condition information, a cycling speed, and the like. After collecting the cycling track, the road condition information, and the cycling speed of a user by the built-in sensors, the mobile terminal can perform a quantification processing on the collected data to obtain specific quantitative values. The cycling APP can calculate the errors of respective data according to the specific quantitative values.

According to the present disclosure, the cycling APP can output the optimum gear shifting strategy to the user, for example, using voice or text. The optimum gear shifting strategy can be outputted by the mobile terminal carried by the user, an on-bicycle terminal, or a smart device bounded with the mobile terminal carried by the user or the on-bicycle terminal. For example, the optimum gear shifting strategy can be outputted to the user in a form of text on a display screen of the mobile terminal, the on-bicycle terminal, or a smart bracelet or a smart watch bounded with the mobile terminal. For example, a text prompt that "the best matched gear shifting combination for the current road condition is XXX" can be directly displayed on the display screen. Furthermore, the optimum gear shifting strategy can also be outputted in a form of voice by a speaker of the mobile terminal, the on-bicycle terminal, or the smart bracelet or the smart watch bounded with the mobile terminal, or a wired earphone connected with the mobile terminal, or a Bluetooth earphone bounded with the mobile terminal. For example, a voice prompt that "the best matched gear shifting combination for the current road condition is XXX" can be played.

After the cycling APP outputs the optimum gear shifting strategy to the user, the user can perform the gear shifting operation according to the prompted gear shifting strategy. Therefore, even an ordinary cyclist can correctly perform a gear shifting operation on different cycling roads, such as a flat road, an upslope road, a downslope road, and the like, by adjusting the bicycle to a reasonable gear ratio according to the prompt outputted by the cycling APP.

Besides the cycling data discussed above, such as the cycling track, the road condition information, and the cycling speed, other data such as physiological state data of the user, cycling environment data, and gradient track data, etc., can also be considered during the gear shifting operation of the user. The physiological state data can include, for example, body temperature and heart rate of the user. The cycling environment data can include, for example, wind speed and wind direction during cycling. The gradient track data can include, for example, total gradient length and upslope or downslope length, etc.

Therefore, when the cycling APP creates the gear shifting strategy library based on the cycling data samples and the gear shifting operation data, other data such as the physiological state data of the user, the cycling environment data, and the gradient track data, etc. can be introduced as gear shifting adjusting data. The gear shifting adjusting data is analyzed, such that the generated gear shifting strategy is optimized and adjusted continuously. Thus, when the gear shifting strategy is outputted to the user, the adjusting strategy with respect to the gear shifting strategy can also be outputted to the user based on the gear shifting adjusting data. The adjusting strategy can be an adjusting suggestion with respect to the outputted gear shifting strategy.

As discussed above, the physiological state data can include the body temperature, the heart rate, and the like, of the user when cycling. The user can wear a heart rate sensor, for example, a hear rate monitor, and a body temperature sensor when cycling. The mobile terminal can establish a binding relationship with the heart rate sensor and the body temperature sensor in advance. Therefore, the mobile terminal can acquire the heart rate change and the body temperature change of the user during cycling in real time through the heart rate sensor and the body temperature sensor.

As discussed above, the cycling environment data can include the wind speed, the wind direction, and the like, during cycling. To detect the wind speed and the wind direction, a wind speed sensor can be installed on the bicycle. The mobile terminal can establish a binding relationship with the wind speed sensor in advance. Therefore, the mobile terminal can acquire the wind speed and wind direction data during cycling in real time through the wind speed sensor.

As discussed above, the gradient track data can include the total gradient length and the upslope or downslope length, etc. During cycling, the cycling APP can calculate the total gradient length and the upslope or downslope length ahead of time in real time according to the GPS position information, the altitude change data, and the gradient change data collected by the mobile terminal in advance.

When the physiological state data such as the heart rate and body temperature of the user is used as the gear shifting adjusting data, the mobile terminal can determine the physical state of the user by analyzing the acquired heart rate and body temperature of the user. Therefore, physical changes during the cycling process of the user can be monitored in real time. After the cycling APP compares the current cycling data with cycling data samples in the gear shifting strategy library to output the corresponding gear shifting strategy to the user, the cycling APP can further output an adjusting strategy with respect to the gear shifting strategy to the user according to the current physical state of the user.

For example, assuming the optimum gear shifting strategy outputted to the user includes setting the front cogset at gear 2 and setting the rear cogset at gear 5, a voice message that "the best matched gear shifting combination for the current road condition is gear 2 of the front cogset and gear 5 of the rear cogset" can be played to the user through a Bluetooth earphone worn by the user. If the cycling APP detects that the user is exhausted by analyzing the heart rate change and the body temperature change of the user, a voice message that "you are exhausted and it is better to reduce the gear ratio to save physical strength" can be played to the user through the Bluetooth earphone worn by the user, to prompt the user to reasonably allocate the physical energy.

When the cycling environment data such as the wind speed and the wind direction during cycling is used as the gear shifting adjusting data, the mobile terminal can monitor the wind speed change and the wind direction change during cycling in real time through the wind speed sensor. After the cycling APP compares the current cycling data with cycling data samples in the gear shifting strategy library to output the corresponding gear shifting strategy to the user, the cycling APP can further output an adjusting strategy with respect to the gear shifting strategy to the user according to the current wind speed and wind direction.

For example, assuming the optimum gear shifting strategy outputted to the user includes setting the cogset at gear 2 and the rear cogset at gear 5, a voice message that "the best matched gear shifting combination for the current road condition is gear 2 of the front cogset and gear 5 of the rear cogset" can be played to the user through the Bluetooth earphone worn by the user. If the cycling APP detects that the user is riding against a relatively strong wind through the wind speed sensor, a voice message that "you are currently riding against the wind and it is better to reduce the gear ratio to save physical strength" can be played to the user through the Bluetooth earphone worn by the user, to prompt the user to reasonably allocate the physical energy.

When the gradient track data such as the total gradient length and the upslope or downslope length, etc., during cycling is used as the gear shifting adjusting data, the mobile terminal can monitor the gradient ahead of the user during cycling. After the cycling APP compares the current cycling data with cycling data samples in the gear shifting strategy library to output the corresponding gear shifting strategy to the user, the cycling APP can further output an adjusting strategy with respect to the gear shifting strategy to the user according to the length of the gradient ahead of the user.

For example, assuming that the optimum gear shifting strategy outputted to the user includes setting the front cogset at gear 2 and setting the rear cogset at gear 5, a voice message that "the best matched gear shifting combination for the current road condition is gear 2 of the front cogset and gear 5 of the rear cogset" can be played to the user through the Bluetooth earphone worn by the user. If the cycling APP detects that the gradient road ahead of the user is relatively long, a voice message that "the gradient road ahead is relatively long and it is better to reduce the gear ratio to save physical strength" can be played to the user through the Bluetooth earphone worn by the user, to prompt the user to reasonably allocate the physical energy.

Figure 2:
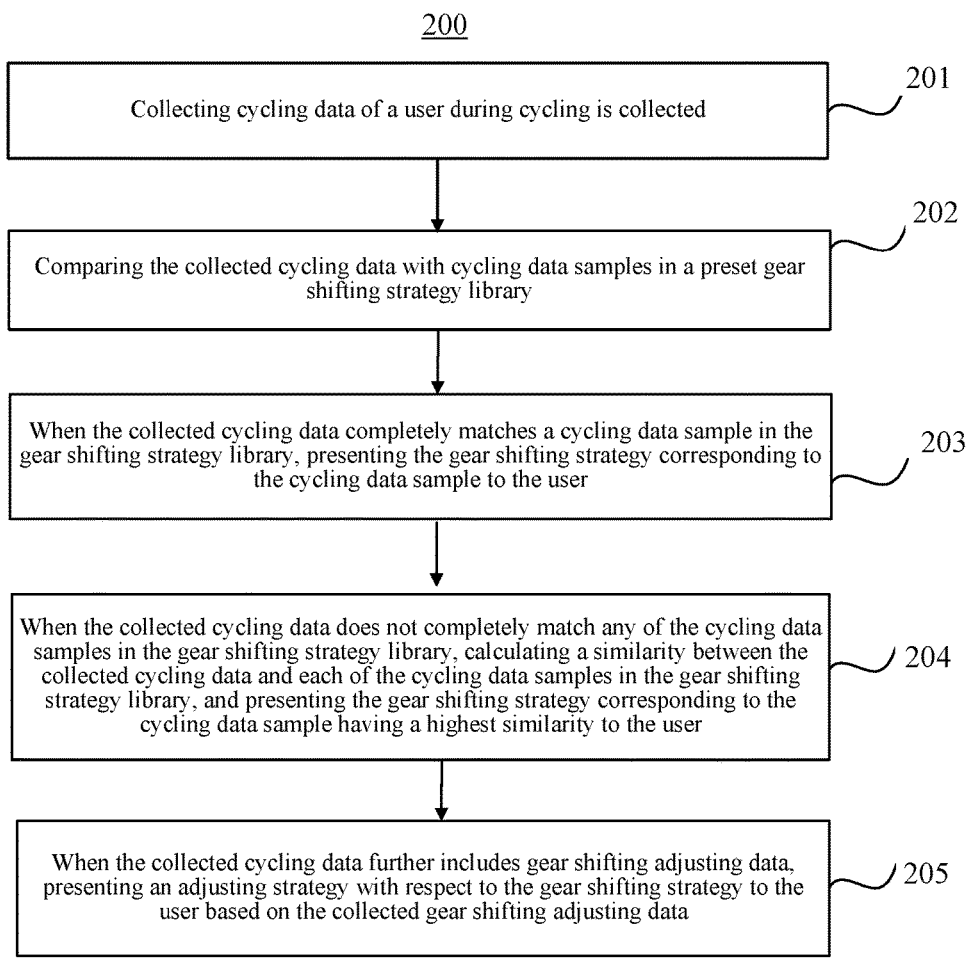
FIG. 2 is a flow chart illustrating a method for prompting bicycle gear shifting according to another exemplary embodiment.

FIG. 2 is a flow chart illustrating a method 200 for prompting bicycle gear shifting according to another exemplary embodiment. As shown in FIG. 2, at 201, cycling data of a user during cycling is collected. At 202, the collected cycling data is compared with cycling data samples in a preset gear shifting strategy library. Processes 201 and 202 in the method 200 are similar to processes 101 and 102 in the method 100, respectively, and thus their detailed description is omitted.

At 203, when the collected cycling data completely matches one of the cycling data samples in the gear shifting strategy library, the gear shifting strategy corresponding to the cycling data sample is outputted to the user.

At 204, when the collected cycling data does not completely match any of the cycling data samples in the gear shifting strategy library, a similarity between the collected cycling data and each of one or more of the cycling data samples in the gear shifting strategy library is calculated, and the gear shifting strategy corresponding to the cycling data sample having a highest similarity is outputted to the user.

At 205, when the collected cycling data further includes gear shifting adjusting data, an adjusting strategy with respect to the gear shifting strategy is outputted to the user based on the collected gear shifting adjusting data. The gear shifting adjusting data includes physiological state data, cycling environment data, or gradient track data.

Details of the method 200, such as the calculation of the similarity and the presentation of the adjusting strategy, are similar to the details of the method 100 described above, and thus are not repeated here.

Figure 3:
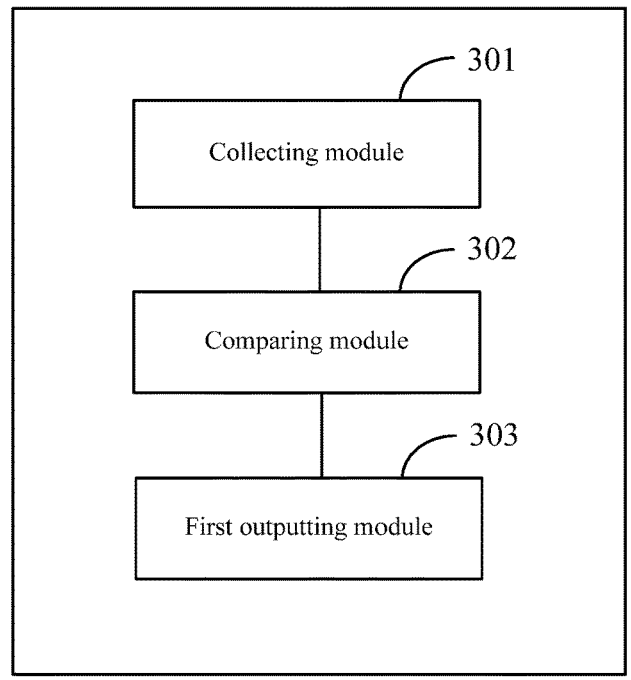
FIG. 3 is a block diagram of a device for prompting bicycle gear shifting according to an exemplary embodiment.

FIG. 3 is a block diagram of a device 300 for prompting bicycle gear shifting according to an exemplary embodiment. As shown in FIG. 3, the device 300 includes a collecting module 301, a comparing module 302, and a first outputting module 303. The collecting module 301 is configured to collect cycling data of a user during cycling. The comparing module 302 is configured to compare the collected cycling data with cycling data samples in a preset gear shifting strategy library. The gear shifting strategy library includes correspondence relationships between preset gear shifting strategies and cycling data samples. The first outputting module 303 is configured to, when the collected cycling data matches a cycling data sample in the gear shifting strategy library, output the gear shifting strategy corresponding to the cycling data sample to the user, to prompt the user to perform a gear shifting operation based on the gear shifting strategy.

Figure 4:
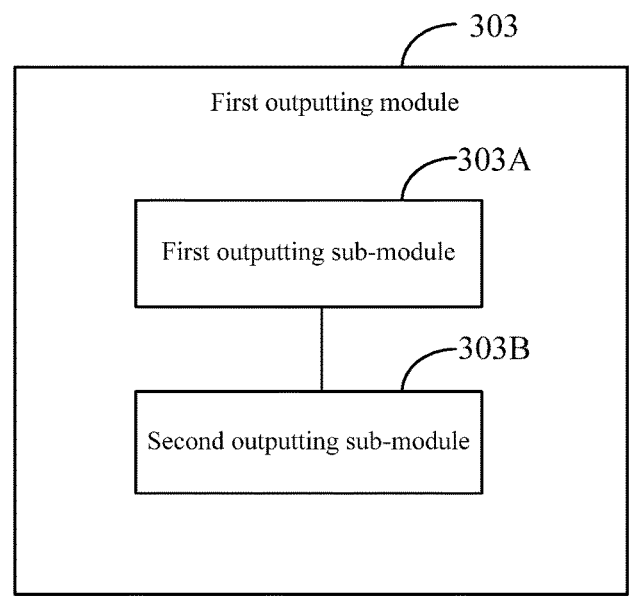
FIG. 4 is a block diagram of an example of a first outputting module shown in FIG. 3.

FIG. 4 is a block diagram of an example of the first outputting module 303. As shown in FIG. 4, the first outputting module 303 includes a first outputting sub-module 303A and a second outputting sub-module 303B. The first outputting sub-module 303A is configured to, when the collected cycling data completely matches one of the cycling data samples in the gear shifting strategy library, output the gear shifting strategy corresponding to the cycling data sample to the user. The second outputting sub-module 303B is configured to, when the collected cycling data does not completely match any of the cycling data samples in the gear shifting strategy library, calculate a similarity between the collected cycling data and each of the cycling data samples in the gear shifting strategy library, and output to the user the gear shifting strategy corresponding to the cycling data sample having a highest similarity.

Figure 5:
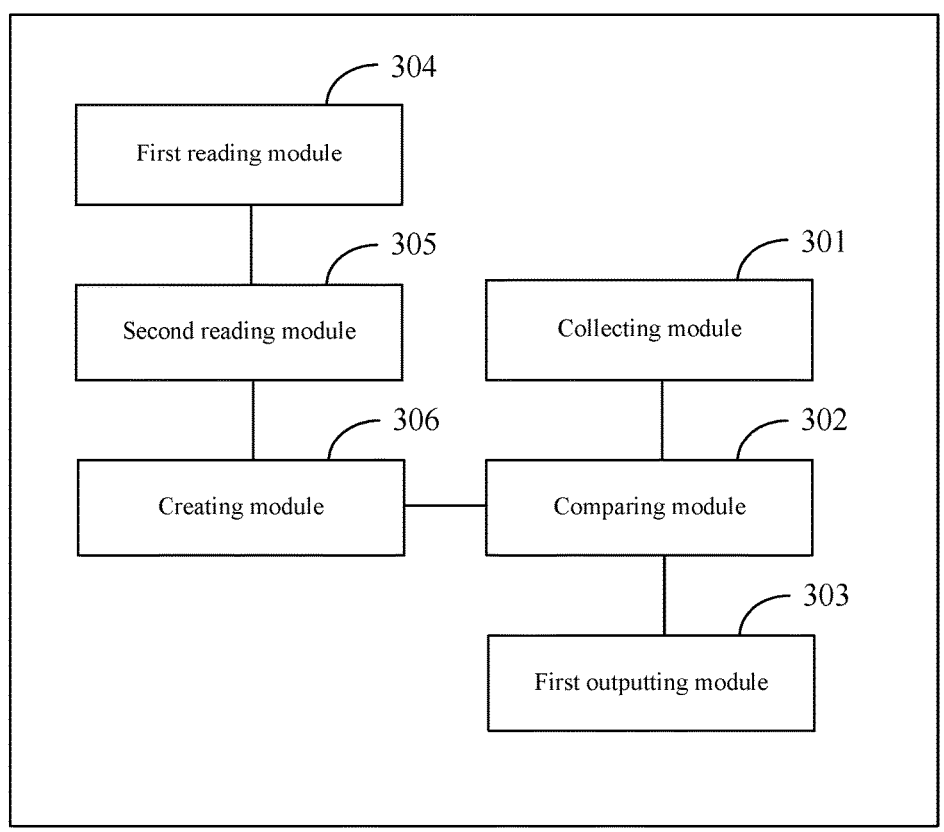
FIG. 5 is a block diagram of a device for prompting bicycle gear shifting according to another exemplary embodiment.

FIG. 5 is a block diagram of a device 500 according to another exemplary embodiment. The device 500 is similar to the device 300, except that the device 500 further includes a first reading module 304, a second reading module 305, and a creating module 306. The first reading module 304 is configured to read gear shifting operation data of a preset user. The gear shifting operation data includes an occurring time of gear shifting operation and a gear shifting result after the gear shifting operation. The second reading module 305 is configured to read cycling data of the preset user collected at the occurring time of the gear shifting operation as a cycling data sample. The creating module 306 is configured to generate a corresponding gear shifting strategy according to the read gear shifting operation data and the cycling data sample, and create the gear shifting strategy library based on the generated gear shifting strategy and the cycling data sample.

Figure 6:
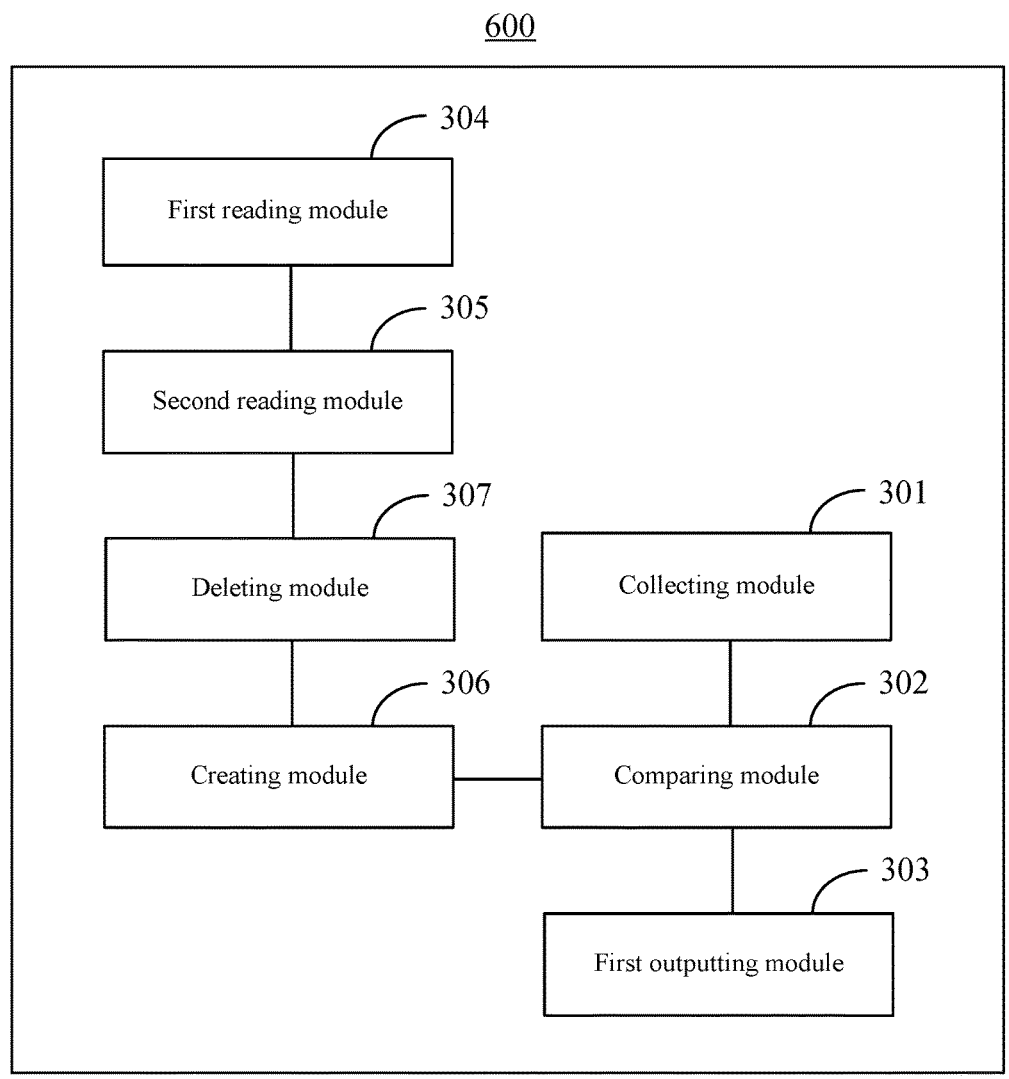
FIG. 6 is a block diagram of a device for prompting bicycle gear shifting according to another exemplary embodiment.

FIG. 6 is a block diagram of a device 600 according to another exemplary embodiment. The device 600 is similar to the device 500, except that the device 600 further includes a deleting module 307 configured to, before the creating module 306 generates the corresponding gear shifting strategy according to the read gear shifting operation data and the cycling data sample, delete an abnormal gear shifting result in the gear shifting operation data.

Figure 7:
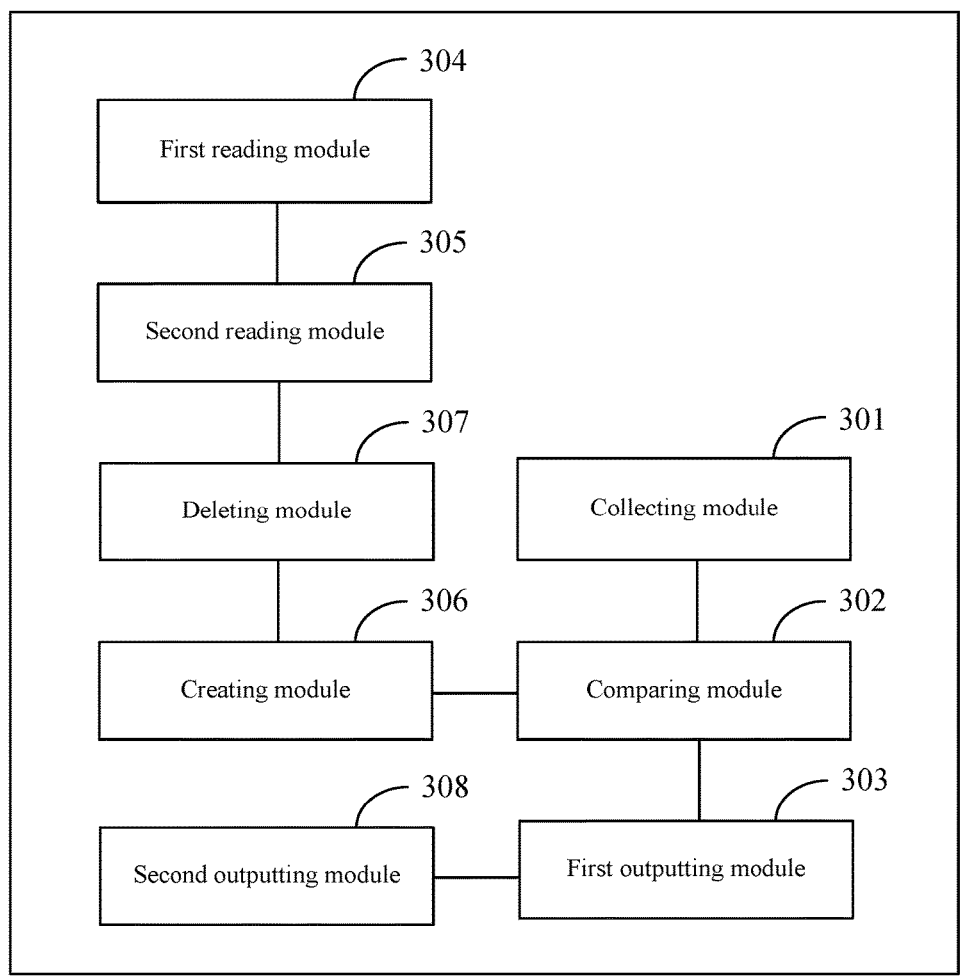
FIG. 7 is a block diagram of a device for prompting bicycle gear shifting according to another exemplary embodiment.

FIG. 7 is a block diagram of a device 700 according to another exemplary embodiment. The device 700 is similar to the device 600, except that the device 700 further includes a second outputting module 308 configured to output an adjusting strategy with respect to the gear shifting strategy to the user based on collected gear shifting adjusting data in the cycling data.

Functions and operations of the modules in the above exemplary devices are similar to the above-described exemplary methods, and thus their detailed description is omitted here.

Correspondingly, the present disclosure provides a device for prompting bicycle gear shifting, including a processor and a memory storing instructions that, when executed by the processor, cause the processor to perform a method consistent with the present disclosure, such as one of the above-described exemplary methods. The device can be implemented, for example, in a terminal.

Figure 8:
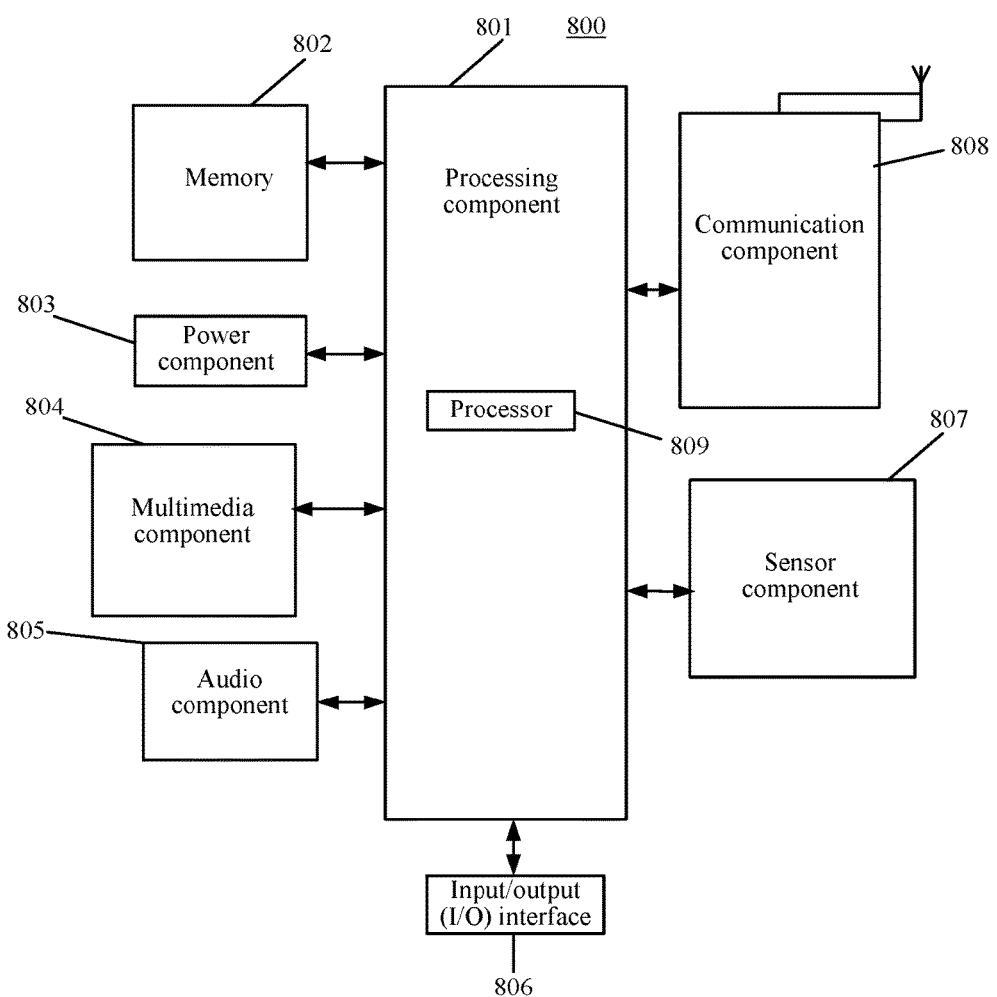
FIG. 8 is a block diagram of a device for prompting gear shifting of a bicycle according to another exemplary embodiment.

FIG. 8 is a block diagram of a device 800 for prompting bicycle gear shifting according to another exemplary embodiment. The device 800 may be the mobile terminal involved in the above embodiments. For example, the device 800 may be a mobile phone, a computer, a digital broadcast terminal, a messaging device, a gaming console, a tablet, a medical device, exercise equipment, a personal digital assistant, or the like.

Referring to FIG. 8, the device 800 includes one or more of the following components: a processing component 801, a memory 802, a power component 803, a multimedia component 804, an audio component 805, an input/output (I/O) interface 806, a sensor component 807, and a communication component 808.

The processing component 801 typically controls overall operations of the device 800, such as the operations associated with display, telephone calls, data communications, camera operations, and recording operations. The processing component 801 may include one or more processors 809 to execute instructions to perform all or part of the steps in the above described methods. Moreover, the processing component 801 may include one or more modules which facilitate the interaction between the processing component 801 and other components. For instance, the processing component 801 may include a multimedia module to facilitate the interaction between the multimedia component 804 and the processing component 801.

The memory 802 is configured to store various types of data to support the operation of the device 800. Examples of such data include instructions for any applications or methods operated on the device 800, contact data, phonebook data, messages, pictures, video, etc. The memory 802 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 803 provides power to various components of the device 800. The power component 803 may include a power management system, one or more power sources, and any other components associated with the generation, management, and distribution of power in the device 800.

The multimedia component 804 includes a screen providing an output interface between the device 800 and the user. In embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In embodiments, the multimedia component 804 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 805 is configured to output and/or input audio signals. For example, the audio component 805 includes a microphone configured to receive an external audio signal when the device 800 is in an operation mode, such as a call mode, a recording mode, and a voice recognition mode. The received audio signal may be further stored in the memory 802 or transmitted via the communication component 808. In embodiments, the audio component 805 further includes a speaker to output audio signals.

The I/O interface 806 provides an interface between the processing component 801 and peripheral interface modules, such as a keyboard, a click wheel, buttons, and the like. The buttons may include, but are not limited to, a home button, a volume button, a starting button, and a locking button.

The sensor component 807 includes one or more sensors to provide state assessments of various aspects of the device 800. For instance, the sensor component 807 may detect an open/closed state of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 807 may include a proximity sensor configured to detect the presence of nearby objects without any physical contact. The sensor component 807 may further include a light sensor, such as a CMOS or CCD image sensor, for use in imaging applications. In embodiments, the sensor component 807 may further include an accelerometer sensor, a gyroscope sensor, a magnetic sensor, a pressure sensor or a temperature sensor.

The communication component 808 is configured to facilitate communication, wired or wirelessly, between the device 800 and other devices. The device 800 may access a wireless network based on a communication standard, such as WiFi, 2G, 3G, or 4G, or a combination thereof. In one exemplary embodiment, the communication component 808 receives a broadcast signal or broadcast associated information from an external broadcast management system via a broadcast channel. In one exemplary embodiment, the communication component 808 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or another technology.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described exemplary methods.

In exemplary embodiments, there is further provided a non-transitory computer-readable storage medium including instructions, such as included in the memory 802, executable by the processor 809 in the device 800, for performing a method consistent with the present disclosure, such as one of the above-described exemplary methods. For example, the non-transitory computer-readable storage medium may be a ROM, a RAM, a CD-ROM, a magnetic tape, a floppy disc, an optical data storage device, or the like.

Wherein when instructions in the storage medium are executed by a processor of a mobile terminal, the mobile terminal is caused to perform a method consistent with the present disclosure, such as one of the above-described exemplary methods.

Other embodiments of the invention may be apparent to those skilled in the art from consideration of the specification and practice of the invention disclosed here. This application is intended to cover any variations, uses, or adoptions of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for prompting bicycle gear shifting, comprising:
   collecting cycling data of a user during cycling;
   comparing the collected cycling data with cycling data samples in a preset gear shifting strategy library including correspondence relationships between preset gear shifting strategies and the cycling data samples; and
   outputting to the user, when the collected cycling data matches one of the cycling data samples in the gear shifting strategy library, the gear shifting strategy corresponding to the cycling data sample,
   wherein outputting the gear shifting strategy corresponding to the cycling data samples includes:
   when the collected cycling data completely matches one of the cycling data samples, outputting the gear shifting strategy corresponding to the cycling data sample to the user; and
   when the collected cycling data does not completely match any of the cycling data samples:
      calculating a similarity between the collected cycling data and each of one or more of the cycling data samples, and
      outputting the gear shifting strategy corresponding to the cycling data sample having a highest similarity to the user.

2. The method of claim 1, wherein collecting the cycling data includes collecting at least one of a cycling track, road condition information, or a cycling speed, the cycling track including a GPS motion track, and altitude changing and gradient changing corresponding to the GPS motion track.

3. The method of claim 1, further comprising:
   reading gear shifting operation data of a preset user, the gear shifting operation data including an occurring time of a gear shifting operation performed by the preset user and a gear shifting result after the gear shifting operation;
   reading cycling data of the preset user collected at the occurring time of the gear shifting operation as a cycling data sample; and
   generating a corresponding gear shifting strategy according to the read gear shifting operation data and the cycling data sample.

4. The method of claim 3, further comprising before generating the corresponding gear shifting strategy:
   deleting an abnormal gear shifting result in the gear shifting operation data.

5. The method of claim 1,
   wherein collecting the cycling data includes collecting gear shifting adjusting data, the gear shifting adjusting data including physiological state data of the user, cycling environment data, or gradient track data, and
   the method further comprising:
      outputting an adjusting strategy with respect to the gear shifting strategy to the user based on the collected gear shifting adjusting data.

6. A terminal, comprising:
   a processor; and
   a memory storing instructions that, when executed by the processor, cause the processor to:
      collect cycling data of a user during cycling;
      compare the collected cycling data with cycling data samples in a preset gear shifting strategy library including correspondence relationships between preset gear shifting strategies and the cycling data samples; and
      output to the user, when the collected cycling data matches one of the cycling data samples in the gear shifting strategy library, the gear shifting strategy corresponding to the cycling data sample,
   wherein, in outputting the gear shifting strategy corresponding to the cycling data, the instructions further cause the processor to:
      when the collected cycling data completely matches one of the cycling data samples, output the gear shifting strategy corresponding to the cycling data sample to the user; and
      when the collected cycling data does not completely match any of the cycling data samples:
         calculate a similarity between the collected cycling data and each of one of more of the cycling data samples, and
         output the gear shifting strategy corresponding to the cycling data sample having a highest similarity to the user.

7. The terminal of claim 6, wherein the cycling data includes at least one of a cycling track, road condition information, or a cycling speed, the cycling track including a GPS motion track, and altitude changing and gradient changing corresponding to the GPS motion track.

8. The terminal of claim 6, wherein the instructions further cause the processor to:
   read gear shifting operation data of a preset user, the gear shifting operation data including an occurring time of a gear shifting operation performed by the preset user and a gear shifting result after the gear shifting operation;
   read cycling data of the preset user collected at the occurring time of the gear shifting operation as a cycling data sample; and
   generate a corresponding gear shifting strategy according to the read gear shifting operation data and the cycling data sample.

9. The terminal of claim 8, wherein the instructions further cause the processor to:
   delete an abnormal gear shifting result in the gear shifting operation data before generating the corresponding gear shifting strategy.

10. The device of claim 6, wherein:
    the cycling data further includes gear shifting adjusting data including physiological state data of the user, cycling environment data, or gradient track data, and
    the instructions further cause the processor to:
       output an adjusting strategy with respect to the gear shifting strategy to the user based on the collected gear shifting adjusting data.

11. A non-transitory storage medium having stored therein instructions that, when executed by one or more processors of a mobile terminal for prompting bicycle gear shifting, cause the mobile terminal to:
    collect cycling data of a user during cycling;
    compare the collected cycling data with cycling data samples in a preset gear shifting strategy library including correspondence relationships between preset gear shifting strategies and the cycling data samples; and
    output to the user, when the collected cycling data matches one of the cycling data samples in the gear shifting strategy library, the gear shifting strategy corresponding to the cycling data sample,
    wherein, in outputting the gear shifting strategy corresponding to the cycling data, the instructions further cause the processor to:

when the collected cycling data completely matches one of the cycling data samples, output the gear shifting strategy corresponding to the cycling data sample to the user; and when the collected cycling data does not completely match any of the cycling data samples:
   calculate a similarity between the collected cycling data and each of one of more of the cycling data samples, and
   output the gear shifting strategy corresponding to the cycling data sample having a highest similarity to the user.

* * * * *